United States Patent Office 2,758,103
Patented Aug. 7, 1956

2,758,103

THE PRESERVATION OF WATER-EMULSION PAINTS WITH HALOACETAMIDES

Walter A. Henson and Willard M. Westveer, Midland, Mich., assignors to The Dow Chemical Company, Midland, Mich., a corporation of Delaware No Drawing. Application May 29, 1952,
Serial No. 290,838

8 Claims. (Cl. 260—29.7)

This invention concerns water-emulsion paints and is particularly directed to an improved water-emulsion paint composition preserved against break-down attributable to the action of microorganisms and to a method for preserving such paints.

The water-emulsion paints have found widespread application in recent years but present commercial formulations are subject to certain disadvantages. For example, thickening agents such as casein and emulsifying agents such as fatty acid esters are commonly included in such paint compositions with the result that the compositions are subject to attack by microorganisms. The resultant microbiological activity frequently leads to objectionable gas formation. Further, the attack by microorganisms may cause an alteration in the viscosity of the system so that brushing and spreading characteristics are impaired and the pigments and fillers are not properly held in suspension.

In present day commercial practice, mercurial and phenolic preservatives have been used in water-emulsion paints. The mercurials have relatively high animal toxicity and may cause yellowing or other discoloration of the paint.

The phenolic agents have been quite effective in inhibiting the growth of microorganisms in paint compositions, but certain problems remain unsolved. For example, it is highly desirable that the reaction of the finished emulsion paint composition be maintained at an alkalinity no greater than pH 8.5 in order to minimize hydrolytic break-down of constituents and detinning of the cans in which paints are normally stored and sold. However, the phenolics are considered adequate in their preservative action only when a pH of 9 or higher is maintained in the emulsion paint composition.

Further, with the phenolic agents, a relatively high concentration is required which contributes to the problems of water sensitivity and spotting which are frequently encountered when present water-emulsion paints are subjected to washing or spattering or to conditions which lead to the condensation of water on coated surfaces. The provision of a more effective means for accomplishing the preservation of the water emulsion paints and for avoiding the difficulties attendant the current practice, is evident.

It is an object of the present invention to provide a preserved water-emulsion paint composition. It is a further object to provide water-emulsion paint compositions preserved against the attack of microorganisms and having improved physical characteristics. Yet another object is to provide an improved method for the preservation of water-emulsion paints. Other objects will become apparent from the following specification and claims.

According to the present invention, it has been found that haloacylamides of the formula

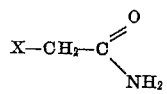

wherein X represents chlorine, bromine or iodine, may be incorporated in water-emulsion paint compositions to provide excellent protection against the attack of microorganisms. These compounds are odorless, crystalline solids, somewhat soluble in water. It is among the advantages of this invention that the haloacylamides have no perceptible effect on the color or viscosity of water-emulsion paint compositions. A further advantage is that the haloacylamide compounds are effective in inhibiting the growth of microorganisms at an alkalinity as low as pH 8.0. Yet another advantage is that the compounds of the invention are effective at sufficiently low concentrations as to exert minimum adverse effects on the water sensitivity of the dried paint film.

The expression "water-emulsion paints" as employed in the present specification and claims refers to those emulsion type coating compositions currently identified as "synthetic latex" paints. These paints and the synthetic latices employed therein as vehicles are described in U. S. Patent No. 2,492,124 as (1) "a paint consisting essentially of an aqueous colloidal solution of one part by weight of a polymer comprising a monovinyl aromatic compound, of the class consisting of monovinyl aromatic hydrocarbons of the benzene series and nuclear chlorinated monovinyl aromatic hydrocarbons of the benzene series, and an aliphatic conjugated diolefine, of the class consisting of butadiene and isoprene, in chemically combined form, the diolefine being in amount corresponding to between 25 and 66 mole percent of all monomeric polymerizable organic compounds of which said polymer is composed, between 0.25 and 1.5 parts by weight of a vegetable drying oil, and a pigment"; and in U. S. Patent No. 2,498,712 as (2) "a paint comprising an aqueous colloidal dispersion of a polymer composed of a mixture of polymerizable unsaturated hydrocarbons, including at least 15 mole percent of a monovinyl aromatic hydrocarbon of the benzene series and between 56 and 60 mole percent of an aliphatic conjugated diolefine of the class consisting of butadiene and isoprene, chemically combined with one another, a pigment added to and admixed with the aqueous dispersion of the polymer, and emulsifying agent and a protective colloid, the polymer being present in amount corresponding to from 15 to 100 percent of the weight of the pigment." Further, various thickening agents and colloidal stabilizers may be present in such mixtures. Other conventional paint ingredients such as dispersants, antifoamers, driers and the like may be added, if desired.

The term "pigments" as used in this specification and claims denotes colored as well as white pigments and is also to be understood as inclusive of mineral products used as fillers and extenders. Suitable pigment materials are well-known and good results have been obtained when employing the lithopones, titanium dioxide, barium sulfate, calcium carbonate, clays, mica, talc, silica and the like in various combinations and proportions depending on the end use for which the paint is designed. Colored pigments and dyes which have been found compatible in these compositions include benzylidene yellow, cadmium yellow, carbon blacks, chromium oxides and hydroxides, Hansa yellow, iron oxides, toluidine toners, sienna, umber and ultramarine blues. Suitable pigment dispersants such as tetrasodium pyrophosphate, lecithin and gum arabic may be employed.

Colloidal thickeners are usually added to water-emulsion paints to provide viscosity, brushability and mechanical stability and to prevent hard setting of the pigments. Protein thickeners such as casein, alpha-protein and isolated soya proteins are commonly used but other agents such as polyacrylate solutions and water-soluble cellulose derivatives such as methyl cellulose, hydroxyethyl cellulose and sodium carboxymethyl cellulose may be used. The thickeners also serve as stabilizers or protective colloids for the synthetic latices which comprise the major portion of the vehicle in these paints.

When operating in accordance with the present invention, conventional paint mixing procedures serve, the critical step being the incorporation in the water-emulsion paint of an anti-microbial concentration of a haloacylamide as set forth above. Any operable concentration of the haloacylamide may be employed provided that unnecessary excesses adapted unfavorably to affect the physical properties of the paint are avoided. In general, a minimum concentration in the finished paint of about 0.05 percent by weight of chloroacetamide or about 0.01 percent by weight of bromo- or iodo-acetamide and a maximum of about 1.0 percent have been found to give good results.

In carrying out the invention, the haloacylamide preservative may be added at any convenient stage of the paint blending process. For example, the haloacylamide may be mixed with the dry pigment prior to the dispersal of the latter in the paint. Alternatively, the haloacylamide may be mixed or ground with a small amount of water to prepare a slurry or paste adapted to be dispersed in the finished paint product or added at an intermediate stage of the mixing procedure. Good results have been obtained by adding chloroacetamide as an aqueous solution and bromoacetamide or iodoacetamide in solution in tributylphosphate. Where casein solutions are employed as thickeners and colloidal stabilizers it is convenient to prepare the thickener-stabilizer solution in large batches to be used over several days to a week or more. In such operations, all or part of the haloacylamide preservative may be added at the time of preparing the casein solution, the preservative then serving to suppress the growth of microorganisms in the thickener-stabilizer solution prior to the final compounding of the paint. Other variations in the mode of addition of the preservative to the water-emulsion paint will be apparent to those skilled in the art.

In a representative operation the ingredients are mixed by conventional procedures in the following proportions by weight:

| | Parts |
|---|---|
| Pigment | 20 to 60 |
| Dispersant | 0.1 to 0.5 |
| Water | 1 to 20 |
| Colloidal thickener | 3 to 8 |
| Synthetic latex (as described in U. S. Patent No. 2,492,124) | 30 to 50 |
| Haloacylamide | 0.05 to 1 |

In a further embodiment of the invention, the following formulation was prepared:

| Composition A: | Parts by weight |
|---|---|
| Titanium dioxide | 25.1 |
| Lithopone | 7.16 |
| Mica (waterground, 325 mesh) | 3.57 |
| Tetrasodium pyrophosphate | 0.18 |
| Water | 19.0 |
| Casein (15 percent aqueous solution) | 9.02 |
| Chloroacetamide (45.4 percent aqueous suspension) | 0.22 |
| Styrene-butadiene copolymer latex | 36.7 |

The titanium dioxide, lithopone, mica, tetrasodium pyrophosphate and water were ground together for approximately three hours in a pebble mill. To the resulting pigment slip, each of the remaining ingredients was added in succession with stirring. The casein solution was prepared by adding with stirring 15 parts by weight of domestic acid casein (24 mesh) to 85 parts of water and heating to 60° C. 1.5 parts of aqueous 28 percent ammonium hydroxide solution was then added and the temperature was maintained at 60° C. for 30 minutes to complete the solution of the casein. The resulting solution was cooled prior to use. The chloroacetamide suspension was prepared by mixing 1 part of chloroacetamide and 1.2 parts of distilled water to obtain a uniform heavy paste. In the preparation of the styrene-butadiene copolymer syntheic latex 45 parts by weight of a mixture of approximately 43.8 mole percent of styrene and 56.2 mole percent of butadiene was dispersed in 55 parts of an aqueous solution consisting of 99.62 percent water, 0.16 percent potassium persulphate, 0.13 percent Aquarex D (the sodium sulphate esters of a mixture of higher alcohols) and 0.09 percent sodium bicarbonate. The dispersion was prepared in a pressure vessel equipped with an agitator and under a pressure sufficient to liquefy the butadiene. The mixture was heated with continual agitation and at a temperature of 95° C. for a period of time until the decrease in pressure indicated that the consumption of the butadiene in the polymerization reaction was nearly complete. The reaction vessel and contents were then cooled, the pressure released and the aqueous colloidal dispersion containing approximately 45 percent of styrene-butadiene copolymer was removed for use in the paint formulation.

The above Composition A was adjusted to a pH range of 8.9–9.1 and inoculated with a mixed culture of organisms isolated from contaminated latex paints or ingredients thereof. The inoculated paint composition was incubated at 37° C. for 24 hours and a portion thereof was streaked on sterile 1.5 percent nutrient agar in a Petri dish. The Petri dish with the streaked agar was further incubated at 37° C. for 24 hours and observed for the growth of microorganisms. No visible growth was found. In contrast, a sample of paint, prepared according to Composition A with the exception that chloroacetamide was omitted, when inoculated, incubated and streaked in an exactly similar fashion, showed significant visible growth of microorganisms.

In an additional operation, the following formulation was prepared:

| Composition B: | Parts by weight |
|---|---|
| Titanium dioxide | 22.10 |
| Lithopone | 6.32 |
| Mica | 3.16 |
| Tetrasodium pyrophosphate | 0.16 |
| Water | 15.80 |
| Casein (aqueous 15 percent solution, NH₃ cut) | 6.95 |
| Latex 762-K[1] (48 percent solids) | 39.71 |
| Tributyl phosphate | 1.50 |

[1] An aqueous colloidal styrene-butadiene copolymer latex as disclosed in U. S. Patent No. 2,498,712.

Composition B was prepared by the procedure set forth above for Composition A. Portions of Composition B were adjusted to alkalinities of pH 8.0, 8.5 and 9.0, the adjustment being accomplished with ammonia or carbon dioxide, respectively, to increase or decrease pH. Varying amounts of chloroacetamide were added to samples of each such pH adjusted portion of Composition B. The resulting compositions were inoculated, incubated and tested for control of microorganisms as previously described for Composition A. The results are set forth in the following table in which no growth of organisms in the agar smear is recorded as "pass" and any observable growth is recorded as "fail."

| pH of Composition | Concentration (percent by weight) of Chloroacetamide | |
|---|---|---|
| | Fail | Pass |
| 8.0 | 0.1 | 0.2 |
| 8.5 | 0.08 | 0.1 |
| 9.0 | 0.03 | 0.05 |

In similar operations, portions of Composition B were adjusted to pH 8.0 and 9.0 and concentration series prepared by the addition of bromoacetamide and iodoacetamide. Each such series was inoculated with the mixed culture, incubated and tested for the control of microorganisms as set forth above with the following results:

| Preservative | Percent by Weight of Haloacetamide Required for Complete Control of Organisms at— | |
|---|---|---|
| | pH 8 | pH 9 |
| Bromoacetamide | 0.2 | 0.01 |
| Iodoacetamide | 0.2 | 0.01 |

In the above operations, no adverse effect of the preservative on the color or physical properties of the paint composition was observed.

We claim:

1. A water-emulsion paint composition normally susceptible to attack by microorganisms which comprises a pigment and a vehicle, and dispersed therein a haloacetamide of the formula

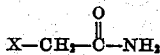

wherein X is selected from the group consisting of chlorine, bromine and iodine, the haloacetamide being present in an amount sufficient to suppress the growth of microorganisms in the composition, said vehicle comprising an aqueous dispersion of a copolymer which comprises in chemical combination at least one mono-vinyl aromatic compound and a conjugated diolefin.

2. A composition according to claim 1 wherein the haloacetamide is present in a minimum concentration of from about 0.01 to 0.05 percent by weight based on the weight of the finished composition.

3. A water-emulsion paint composition normally susceptible to attack by microorganisms which comprises a pigment and a vehicle, and dispersed therein chloroacetamide in an amount sufficient to suppress the growth of microorganisms in the composition, said vehicle comprising an aqueous dispersion of a copolymer which comprises in chemical combination at least one mono-vinyl aromatic compound and a conjugated diolefin.

4. A water-emulsion paint composition normally susceptible to attack by microorganisms which comprises a pigment and a vehicle, and dispersed therein bromoacetamide in an amount sufficient to suppress the growth of microorganisms in the composition, said vehicle comprising an aqueous dispersion of a copolymer which comprises in chemical combination at least one mono-vinyl aromatic compound and a conjugated diolefin.

5. A water-emulsion paint composition normally susceptible to attack by microorganisms which comprises a pigment and a vehicle, and dispersed therein iodoacetamide in an amount sufficient to suppress the growth of microorganisms in the composition, said vehicle comprising an aqueous dispersion of a copolymer which comprises in chemical combination at least one mono-vinyl aromatic compound and a conjugated diolefin.

6. A method for controlling the growth of microorganisms in water-emulsion paints normally susceptible to attack thereby which comprises the step of adding to the paint composition a haloacetamide of the formula

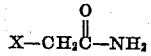

wherein X is selected from the group consisting of chlorine, bromine and iodine, said haloacetamide being employed in an amount sufficient to suppress the growth of microorganisms in the paint and said composition containing as a vehicle an aqueous dispersion of a copolymer which comprises in chemical combination at least one mono-vinyl aromatic compound and a conjugated diolefine.

7. The method of claim 6 wherein the haloacetamide is employed in the amount of at least from about 0.01 to 0.05 part by weight of haloacetamide per 100 parts of finished paint.

8. The method of claim 6 wherein the haloacetamide is chloroacetamide.

References Cited in the file of this patent

UNITED STATES PATENTS

| 2,467,192 | Cupery | Apr. 12, 1949 |
| 2,492,124 | Young et al. | Dec. 20, 1949 |
| 2,498,712 | Ryden | Feb. 28, 1950 |
| 2,605,242 | Betts et al. | July 29, 1952 |

OTHER REFERENCES

Mattiello: "Protective and Decorative Coatings," vol. 3, John Wiley, New York (1943), page 471.

Leonard et al.: Journal of Bacteriology, vol. 57 (1949), pages 339 to 347.

Chemical Abstracts (1), vol. 43: 5081 g (1949).

Chemical Abstracts (2), vol. 44: 3077 d (1950).